United States Patent [19]
Carroll et al.

[11] Patent Number: 5,229,831
[45] Date of Patent: Jul. 20, 1993

[54] ULTRAMINIATURE TACTICAL GRADE CRYOGENIC RFOG

[75] Inventors: Raymond Carroll, Andover; Bruce Porter, Sudbury, both of Mass.

[73] Assignee: The Charles Stark Draper Laboratory, Inc., Cambridge, Mass.

[21] Appl. No.: 763,342

[22] Filed: Sep. 20, 1991

[51] Int. Cl.[5] .............................. G01C 19/72
[52] U.S. Cl. ................................ 356/350; 385/14
[58] Field of Search ................... 356/350, 345; 250/227.19, 227.27; 372/94; 385/12, 14

[56] References Cited

U.S. PATENT DOCUMENTS

| | | | |
|---|---|---|---|
| 3,612,883 | 10/1971 | Pederson | 250/216 |
| 4,678,334 | 7/1987 | Coate et al. | 356/350 |
| 4,702,601 | 10/1987 | Schroder | 356/350 |
| 4,708,480 | 11/1987 | Sasayama et al. | 356/350 |

OTHER PUBLICATIONS

"Resonator FOG using LiNbO3 Integrated Optics at 1.5 µm", Sanders et al., 1990, pp. 1-9.
Single-Mode Optical Fiber Resonator and Applications to Sensing, by Loren Frank Stokes, G.L. Report No. 3620, Edward L. Ginzton Laboratory, W. W. Hansen Laboratories of Physics, Stanford University, Sep. 1983.

Primary Examiner—Samuel A. Turner
Attorney, Agent, or Firm—Lahive & Cockfield

[57] ABSTRACT

An axial gyroscopic pointing reference for mounting on optics within an internally cooled telescope a resonant fiber optic gyroscope, in which the elements of the fiber optic gyroscope are cryogenically cooled with the same system that cryogenically cools the telescope optical elements. In one specific configuration the pointing reference includes three orthogonally positioned resonant fiber optic gyroscopes supported in a tetrahedron configuration and cryogenically cooled by the telescope cooling system.

7 Claims, 4 Drawing Sheets

ULTRAMINIATURE TACTICAL GRADE CRYOGENIC RFOG

BACKGROUND OF THE INVENTION

This invention relates in general to resonant fiber optic gyroscopes (RFOGS) and more particularly to a miniature fiber optic resonant gyroscope for mounting as an axial pointing reference on the focal plane substrate within a telescope.

Infrared telescopes are usually cryogenically cooled in order to improve their signal to noise ratio. In order to maintain the telescope optical axis pointed precisely in the desired direction, a pointing reference such as a gyroscope has been employed. However, under cryogenic cooling variations, mechanical dimensions change such that an externally mounted pointing reference may not maintain the optical axis of the telescope pointed in a specific direction. While these differences in direction are small, they can be critical. This problem can be overcome if the pointing reference can be itself mounted within the telescope on the same substrate as the focal plane, or on a suitably located optical element such as a mirror.

Conventional (non-fiber optic) gyroscopes are much too large for this purpose. Interferometric fiber optic gyroscopes (IFOGS) require long lengths of fiber (>200 meters) on a large diameter coil (>3") and so are not well suited as a telescope pointing reference. Resonant fiber optic gyroscopes (RFOGS) require only 10 meters to 100 meters of fiber. Rotation sensitivity is affected by:

1) shot noise that depend on factors such as laser intensity, gyro system loss, laser linewidth, rign resonator linewidth, and photodetector/preamplifier noise; and
2) thermal drift in the presence of polarization crosstalk and optical backscatter.

Because of these factors, RFOGS still require a 3" diameter resonance coil, and so are not well suited for this application.

SUMMARY OF THE INVENTION

Broadly speaking, in the present invention a miniature lightweight gyroscope is provided to serve as a telescope pointing reference. This gyroscope can conveniently be mounted on the focal plane substrate or other optical element substantially on the optical axis within the telescope. By cryogenically cooling a fiber optic resonant gyroscope (CRFOG), shot noise and thermal drift can be reduced to provide an acceptable level of output error even when a smaller diameter coil is used. The planar fiber coil geometry can advantageously use anti-shupe winding, thereby minimizing sensitivity to time varying thermal gradients. In the application on an infrared telescope, mounting the RFOG within the telescope allows it to be cryogenically cooled by the infrared telescope cooling system.

In one specific embodiment three RFOGS to provide for three axis directionality are orthogonally mounted on a tetrahedron support, with the base plate of the tetrahedron being used to carry elements, such as a laser, common to all three gyroscopes.

Room temperature RFOGS are designed so as to achieve shot noise limited performance. Shot noise limited performance can also be achieved in a cryogenic RFOG. Laser intensity, laser linewidth, and system loss are therefore the major determinants of the cryogenic RFOG rotation sensitivity.

Laser threshold decreases and laser quantum efficiency increases at 77K, resulting in a three to four fold increase in output power. Tests have indicated that a cryogenic RFOG will have system loss comparable to a room temperature RFOG (within 0.5dB). Since shot noise is proportional to (power) $^{\frac{1}{2}}$, signal-to-noise ratio is enhanced by a factor of two.

Rotation sensitivity is affected by laser and ring line width. When fused coupler technology is used, cryogenic ring resonators can be made with a finesse of >200. For a 100 m loop length, a 10 kHz cryogenic ring line width can be achieved. High coherence laser sources typically have a linewidth around 100 kHz at room temperature. Because laser linewidth is much larger than the ring linewidth, the ring response FWHM, and hence its rotation sensitivity is controlled by laser linewidth. Based on theory developed by Schawlow and Townes, a cryogenic laser will have a linewidth twenty times narrower than a room temperature laser, and this results in an approximately ten-fold increase in rotation sensitivity.

Photodetector/preamplifier noise is dominated by the thermal noise of the feedback resistor, which decreases by a factor of two at 77K compared to room temperature.

Using the predicted performance improvements for the components described above, the noise limited performance of a cryogenic RFOG is predicted to be about 0.1 Hz. For a 1 inch ring resonator, this corresponds to noise limited performance of around 0.2 deg/hr (1 Hz output filter).

Gyro bias is caused primarily by coherent backscatter and polarization cross coupling when ring resonators with symmetric dips are used. The magnitude of the bias is controlled by the phase of these error signals, which depends on fiber length. A room temperature RFOG will experience bias drift caused by fiber length changes with temperature. On the other hand, a cryogenic RFOG will be in a very stable thermal environment, and so is expected to have substantially reduced drift.

It is a primary object of the present invention to provide a high sensitivity, low length, cryogenically cooled miniature RFOG.

It is another object of the present invention to provide a high sensitivity, low length cryogenically cooled miniature RFOG mounted as a pointing reference on the focal plane of an infrared telescope.

It is also an object of this invention to provide a three axis RFOG assembly, where each RFOG is a miniature, lightweight high sensitivity RFOG and, where the entire subassembly is mounted within a cryogenic cooling system.

DESCRIPTION OF PREFERRED EMBODIMENTS

Figure 1:
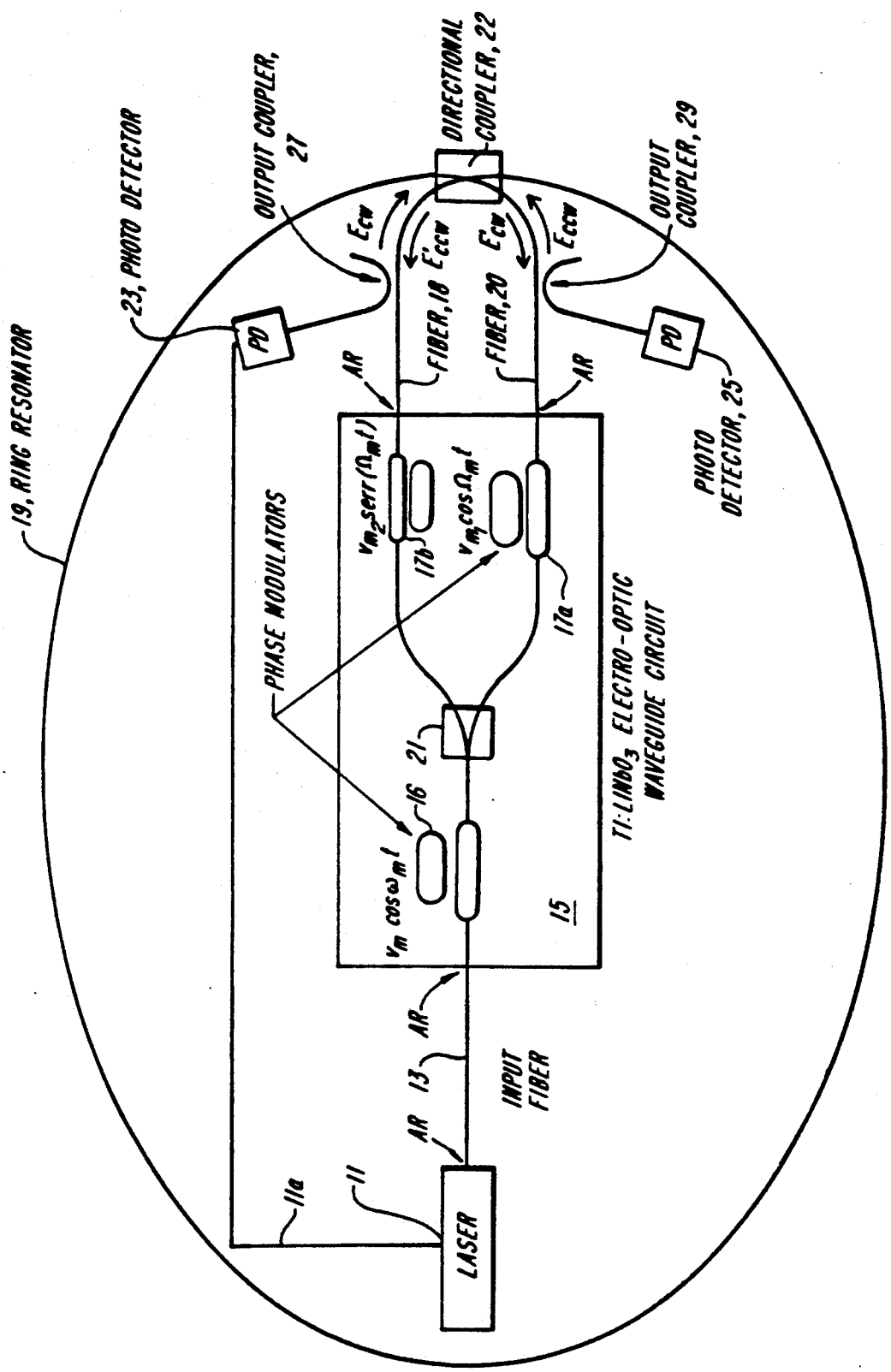
FIG. 1 is an illustration in diagrammatic form of a typical fiber optic gyroscope system for use in the practice of this invention.

FIG. 1 is an illustration generally in diagrammatic form of a state-of-the-art RFOG suitable for use in the practice of this invention. The laser 11 emits a coherent light beam at a controlled frequency. The beam is coupled through input fiber 13 to an optical phase modulator 16 mounted as one element in an electro-optic waveguide circuit 15. Waveguide circuit 15 is typically a titanium diffused LiNbO$_3$ diffused element. The optical phase modulator 16 is formed on Ti: LiNbO$_3$ with metal electrodes. The modulated output from phase modulator 16 is split in Y coupler 21 into two substantially equal outputs, each of which passes through phase modulators 17a and 17b. Electrical signals $V_1 = V_{m1} \cos \Omega_m t$ and $V_{m2}$ Serr $(\Omega_{m2} t)$ are applied to modulators 17a and 17b respectively. The signal $V_2$ is a serrodyne (i.e., sawtooth) waveform with peak value $V_{m2}$ and repetition rate $\Omega_{m2}$. Both outputs 18 and 20 are provided through output couplers 27 and 29 and directional coupler 22 to the ring resonator 19. The light from output 18 is coupled to the ring 19 to travel in a clockwise direction around it, while the light from the output 20 is coupled through directional coupler 22 to ring 19 to travel in a counterclockwise direction around it. The laser frequency is tuned with electrical signal 11a to track the counterclockwise resonance as detected by photodetector 23. The serrodyne repetition frequency $\Omega_{m2}$ is tuned to track the clockwise resonance frequency as detected by photodetector 25. The frequency $\Omega_{m2}$ provides an indication of the rotation of the plane of the ring 19 by virtue of the Sagnac effect whereby this RFOG may be constructed without the feedback signal 11a, and in some embodiments, also without phase modulator 17b.

Figure 2:
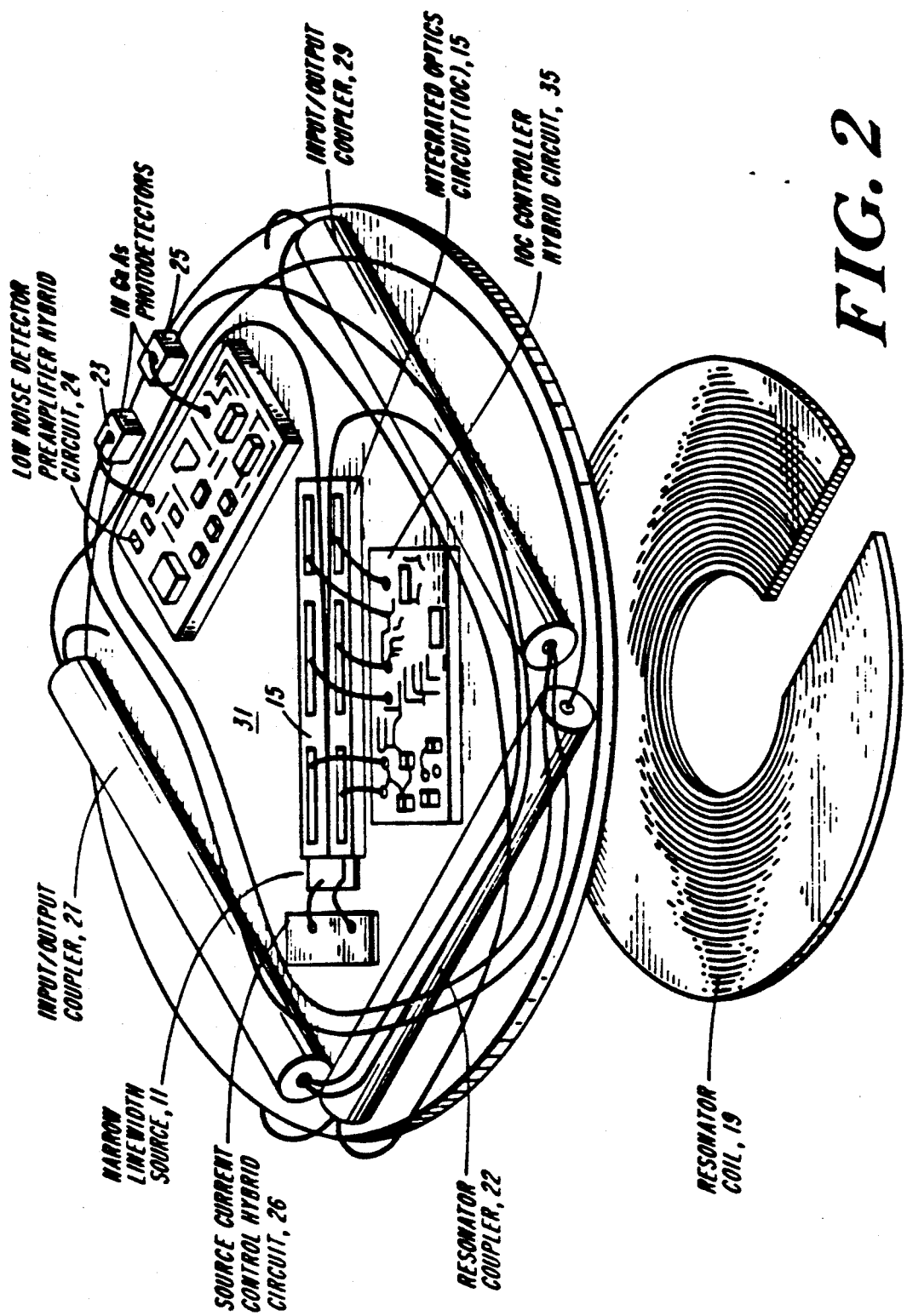
FIG. 2 is a plan view of a miniature RFOG mounted on a substrate for the practice of this invention.

FIG. 2 is an illustration of a small, lightweight RFOG of the type illustrated in FIG. 1. It is constructed for cryogenic operation in accordance with the principles of the present invention. Like numbers refer to like parts in FIG. 1. Resonator coil 19 is formed as a compact ring by employing anti-Shupe winding in which the coil is wound in a dual spiral configuration. By employing this anti-Shupe winding, points in the optical fiber equi-distant from the midpoint of the length are nearly adjacent to one another. The anti-Shupe winding coil is wound by starting at the middle of the fiber length and winding simultaneously the two coils in opposite spiral directions from a spindle spiraling radially out. The optical fiber jacket may be coated with an adhesive during winding so that the fibers adhere in a spiral pancake shape after the adhesive has set. Employing this technique a resonance coil 12 meters long and 1" or less in diameter may be fabricated.

The remainder of the components of the RFOG are illustrated on a substrate 31. The mounted components are those which have been indicated schematically in FIG. 1. In addition to those elements the substrate includes a low noise detector preamplifier hybrid circuit 24, to which the photodetectors 23 and 25 are connected and a current control hybrid circuit 26 for controlling the laser source 11. For cryogenic operation, the size of the substrate is approximately 1", the total volume of the RFOG is 1.4 cubic centimeters, and the mass is approximately 3.6 grams.

Figure 3:
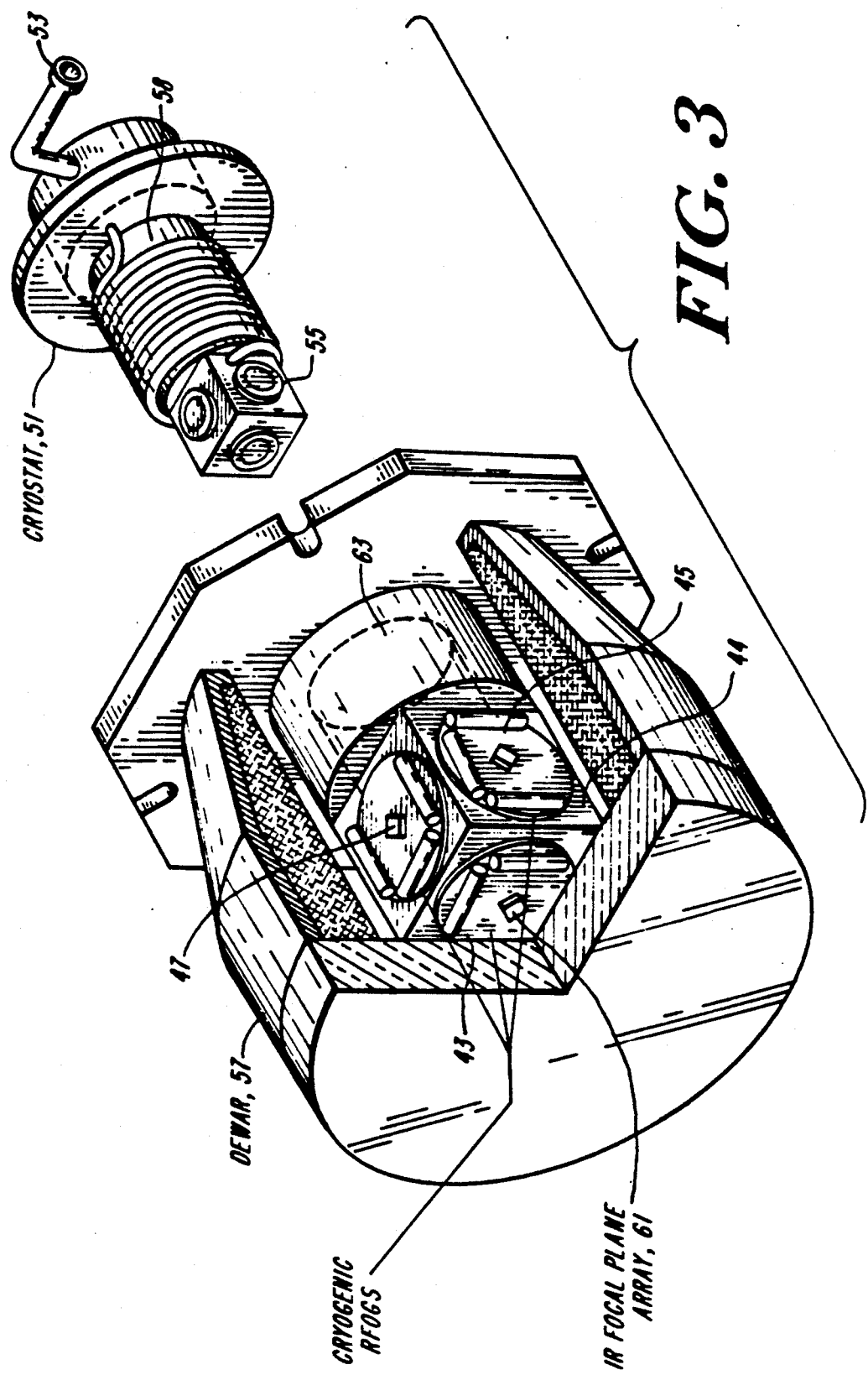
FIG. 3 is an illustration in perspective view of a three RFOG system for use in the practice of this invention.

FIG. 3 shows a three cryogenic RFOG guidance system. Three individual RFOG's 43, 45, and 47 are shown mounted on three faces of a cubical mounting structure 44. A cryostat 51 with a cylindrical cooling coil, terminating in a cubical section 55, can be inserted into an opening 53 of a Dewar flask 57 to provide continuous cryogenic cooling for the RFOG's.

Figure 4:
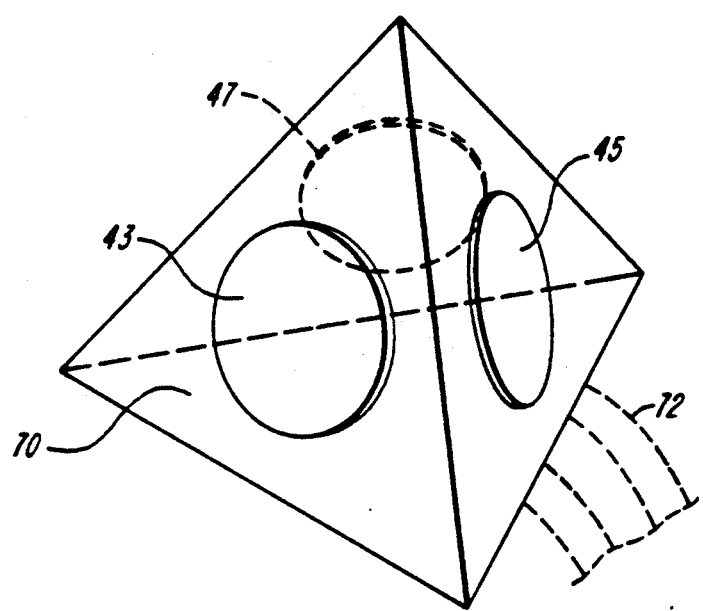
FIG. 4 is an illustration of three RFOGS mounted on a tetrahedron structure.

As an alternative to the cubical form illustrated in FIG. 3, a tetrahedral structure, as illustrated in FIG. 4 may be employed. In the tetrahedral configuration, the tetrahedron may be formed of beryllium oxide with the RFOG's 43, 45 and 47 carried on three faces, while common elements may be mounted on baseplate 70, to which is applied a cable 72, including electrical connections to and from the RFOG's. Such common elements may include, for example, a single laser source as well as preamplifiers, power supplies, etc.

While specific embodiments of the invention have been shown, the invention should be limited only as described in the appended claims.

We claim:

1. An axial gyroscopic pointing reference for mounting on optics within an internally cooled telescope comprising,
    a resonant fiber optic gyroscope mounted on a substrate common to an optical element within said telescope, and cryogenically cooled by the telescope cooling system.

2. A gyroscopic pointing reference in accordance with claim 1 wherein said resonant fiber optic gyroscope includes a miniature anti-Shupe wound fiber optic resonance ring.

3. An axial gyroscopic pointing reference for mounting on optics within an internally cooled telescope comprising three orthogonally positioned resonant fiber optic gyroscopes supported in a tetrahedron configuration and cryogenically cooled by said telescope cooling.

4. An axial gyroscope pointing reference for mounting on optics within an internally cooled telescope comprising,
    a laser source having a center frequency,
    a fiber optic ring having a resonance peak near said laser center frequency,
    first and second photodetectors,
    a first optical coupler means for splitting said laser beam into two separate beams,
    second optical coupler means for coupling one of said beams to said fiber optic ring to propagate light around said ring in a first direction, and the other of said beams around said ring in the opposite direction,
    third optical coupler means coupling a portion of said light propagating in a first direction to said first photodetector and in the opposite direction to said second photodetector,
    circuit means connected to said first and second photodetectors to determine the difference in frequency between signals for said first and second photodetectors as indicative of rotation of said ring, and
    cryogenic cooling means for cooling at least one of said laser source, said fiber optic ring, said photodetectors, said optical coupler means and said circuit means to a temperature below 100° K.

5. An axial gyroscope pointing reference in accordance with claim 4 wherein said laser source is cryogenically cooled.

6. An axial gyroscope pointing reference in accordance with claim 5 wherein said laser source and said photodetectors are cryogenically cooled.

7. An axial gyroscope pointing reference in accordance with claim 4 wherein said laser source, said fiber optic ring, said photodetectors and said circuit memo are all cryogenically cooled.

* * * * *